May 21, 1963  W. C. BLACK, SR., ET AL  3,090,514
LOAD CARRYING VEHICLE
Filed Sept. 12, 1960
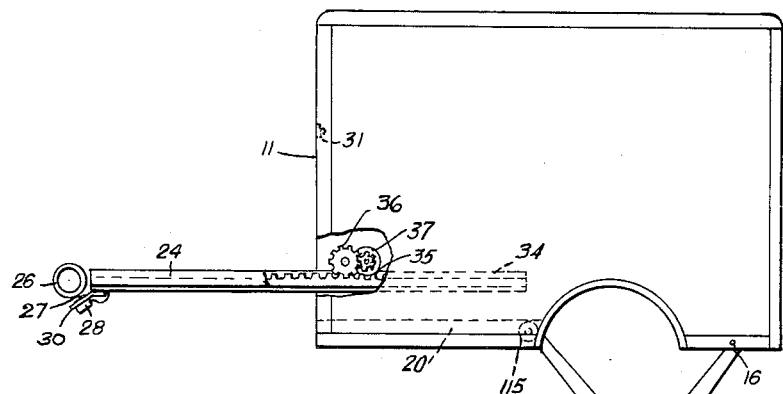
FIG.1
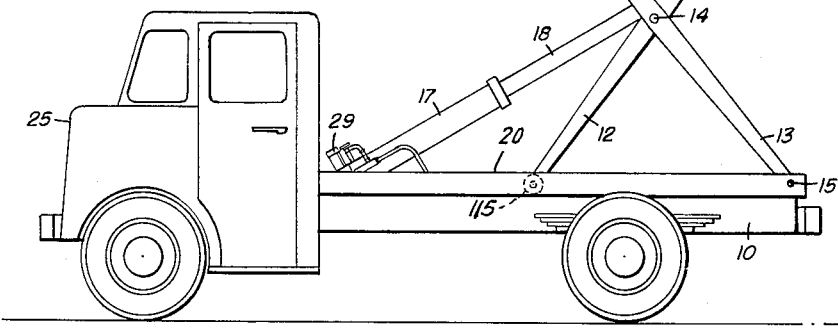
FIG.2
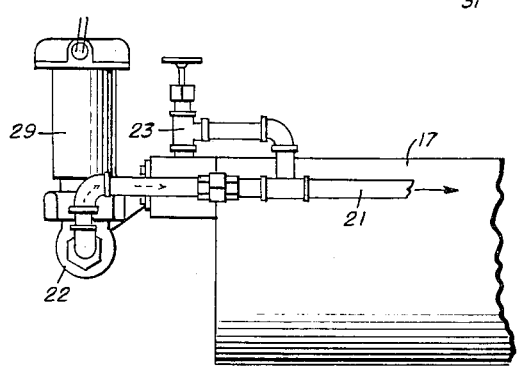
FIG.3
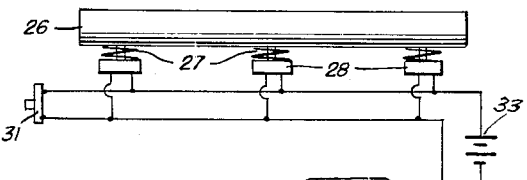
INVENTORS
WILLIAM C. BLACK, SR.
PAUL A. CRESCI
BY *Whittemore, Hulbert & Belknap*
ATTORNEYS United States Patent Office 3,090,514
Patented May 21, 1963

1

3,090,514
LOAD CARRYING VEHICLE
William C. Black, Sr., 276 Tonnele Ave., Jersey City, N.J., and Paul A. Cresci, Boulevard and Grape Sts., Vineland, N.J.
Filed Sept. 12, 1960, Ser. No. 55,590
2 Claims. (Cl. 214—512)

This invention relates to safety apparatus associated with mechanism for elevating the body of a truck above its chassis, particularly to means for avoiding undue contact or pressure of a part of the body with respect to airplanes.

Trucks designed to load and unload cargo into or out of planes usually are provided with a retractable bridge on the body, the bridge being extended to position its end in proximity to the body of the plane at a door or opening therein. During the elevation of the truck body and bridge there is a possibility that the bridge may be extended sufficiently to come into contact with the plane and, since the the elevating mechanism would in such circumstances exert very heavy pressure against the plane, severe damage could result.

It is an object of the present invention to provide means on the extensible bridge to interrupt elevation of the body upon contact of the bridge with the plane.

It is a further object of the invention to provide hydraulic lift mechanism for a truck body including a fluid release valve and automatic actuating means to prevent flow of fluid to the hydraulic lift thereby interrupting elevation of the body.

It is another object of the invention to provide electrically actuated means for operating the release valve including contact responsive switch means as well as manual controls for the valve.

Other objects will be apparent from the following description when taken with the accompanying drawings in which FIG. 1 is a side elevation of a truck showing a preferred embodiment of the invention;

FIG. 2 is an end view of valves and a hydraulic cylinder, together with a wiring diagram of the electrical switch controls therefor; and FIG. 3 is a side elevation of the valves and cylinder shown in FIG. 2.

In the drawings, the chassis frame 10 is connected to the truck body 11 by levers 12 and 13 pivoted to each other at 14. It is to be understood that there are two pairs of levers, a pair at each side of the truck. Each lever is pivoted at one end to the chassis at 15 and 16 and is provided with a roller 115 at its other end for rolling engagement with tracks 20 on the chassis and truck body. The means for elevating the truck body include a hydraulic cylinder 17 and piston 18. Fluid under pressure is supplied to the cylinder from a pump (not shown) through pipe 19. Fluid is discharged from the cylinder through pipe 21 leading to a reservoir (not shown) from which the fluid is drawn by the pump. A solenoid valve 22, which is normally closed, and a manually operated valve 23, also normally closed, may be opened to permit fluid to be withdrawn from the hydraulic cylinder or to by-pass fluid from the pump direct to the reservoir.

Mounted for sliding movement on the truck body is a motor-operated extensible platform 24 which can be withdrawn into the truck to clear cab 25 when the body is lowered, but which is extended to be brought into close proximity to a plane or the like when the body is elevated to facilitate loading and unloading of cargo. The platform 24 is slidable in channels 34 on opposite sides of the body and is provided with rack teeth 35 cooperating with

2 pinion 36 adapted to be rotated by motor 37. To preclude any contact of the platform with the plane which might, because of pressure of the platform against the airplane body, damage the plane, the end of the platform has mounted thereon a bumper in the form of a rubber member 26 yieldably mounted on the platform by means of springs 27 which permit the bumper to move vertically or horizontally with respect to the platform 24. Thus if any part of the bumper were to contact the body of the airplane into which it is being moved for cargo loading and unloading and meet resistance either horizontally or vertically because of such contact, the bumper would be moved to close one or more of a plurality of switches 28 attached to the platform along its forward edge, as well as to the bumper. It will be noted that the mounting means 30 for switches 28 comprise brackets disposed at an angle to the plane of the platform so that any undue pressure exerted against the bumper from above or in front of the bumper will result in closing of one or more of switches 28.

There is also provided on a panel within the truck body 11 a manually operated switch 31. These switches are all in an electrical circuit 32 which also includes a solenoid 29 and a source of electrical energy, such as a battery 33, as indicated in FIG. 2. Upon closing of any of switches 28, responsive to displacement of bumper 26, solenoid 29 will be energized to open valve 22 to release fluid from cylinder 17 and by-pass fluid from the pump to the reservoir. It is to be understood that when the bumper is no longer under contact pressure switches 28 will return to normal open position so that solenoid 29 will be deenergized and valve 22 closed. Thus the platform will be automatically maintained at such height that no damage to the plane can result. The vehicle may then be maneuvered to bring the platform into proper relation with the door of the plane. Switch 31 permits an attendant in the truck body to close the circuit independently of switches 28 to energize solenoid 29 when it is desired to release fluid from cylinder 17 and lower the body until it rests on the chassis. The weight of the body is sufficient to force fluid from the cylinder, permitting the body gradually to lower itself. If, for any reason, the electrical controls fail to function properly, or, if an attendant standing at ground level desires to lower the truck body, manual valve 23 located on the chassis may be opened to release fluid from the hydraulic cylinder.

It is apparent from the foregoing description that the platform cannot exert sufficient pressure on the plane to damage it when it comes in contact with the plane. There is also provided in the same electrical circuit a manually operated switch to control lowering of the truck or by-passing of fluid around the lift mechanism.

While a preferred form of the invention has been illustrated and described, it is contemplated that such changes as fall within the scope of the claims may be made.

What is claimed is:

1. A load carrying vehicle comprising a chassis, a body overlying said chassis, fluid operated elevating mechanism comprising arms and a hydraulic ram including a cylinder and piston cooperating with said arms for raising said body above said chassis, valve means for releasing fluid from said cylinder when said valve means is opened to interrupt elevation of said body, a solenoid for opening said valve, an electrical circuit including said solenoid and a source of electrical energy, switch means for making and breaking said circuit, a bumper on said body, supporting means for said bumper and said switch means, said supporting means being connected to said body and inclined both to the horizontal and vertical relative to said body, yieldable means connecting said bumper to said supporting means, and means connecting said bumper to said switch means, said yieldable means normally holding said bumper in circuit breaking position, said yieldable means yielding to pressure exerted either horizontally or vertically on said bumper to close said switch means thereby to energize said solenoid and open said valve.

2. A load carrying vehicle as claimed in claim 1 in which fluid under pressure directed to said cylinder is by-passed through said valve when open to a discharge conduit thereby to direct the fluid away from said cylinder.

References Cited in the file of this patent

UNITED STATES PATENTS

| | | |
|---|---|---|
| 2,199,274 | Taylor | Apr. 30, 1940 |
| 2,379,094 | Maxon | June 26, 1945 |
| 2,687,455 | Norman | Aug. 24, 1954 |
| 2,797,833 | Cash | July 2, 1957 |
| 2,883,079 | Binns | Apr. 21, 1959 |
| 2,924,297 | Brandon | Feb. 9, 1960 |
| 2,935,218 | Fritz | May 3, 1960 |